No. 730,461. PATENTED JUNE 9, 1903.
J. ISAACSON & E. EVANS.
GRAIN DOOR.
APPLICATION FILED APR. 6, 1903.
NO MODEL. 2 SHEETS—SHEET 1.

Witnesses
J. T. Fisher
C. J. Rosen

Inventors
John Isaacson
Evan Evans
By J. A. Rosen
Their Atty

No. 730,461. PATENTED JUNE 9, 1903.
J. ISAACSON & E. EVANS.
GRAIN DOOR.
APPLICATION FILED APR. 6, 1903.
NO MODEL. 2 SHEETS—SHEET 2.
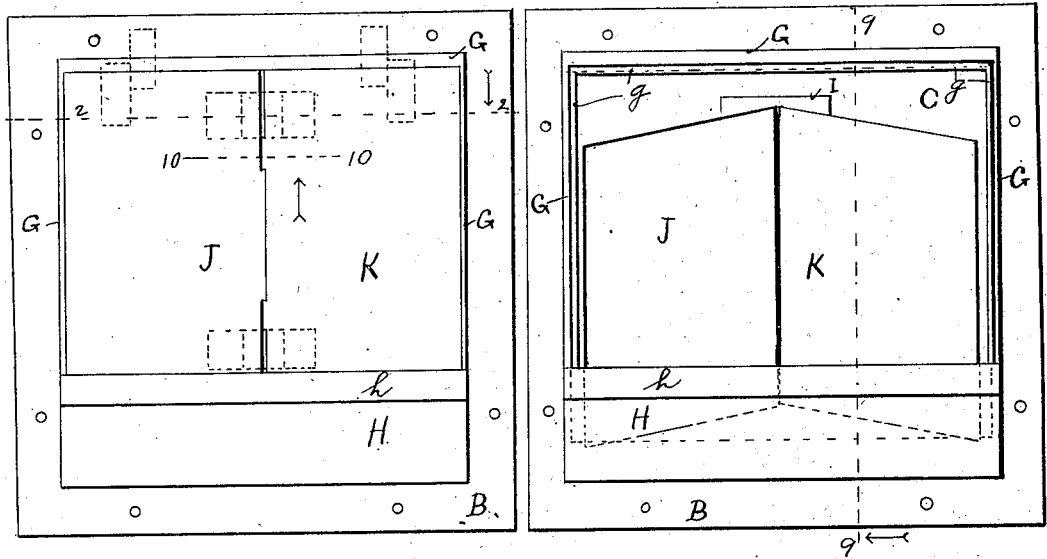
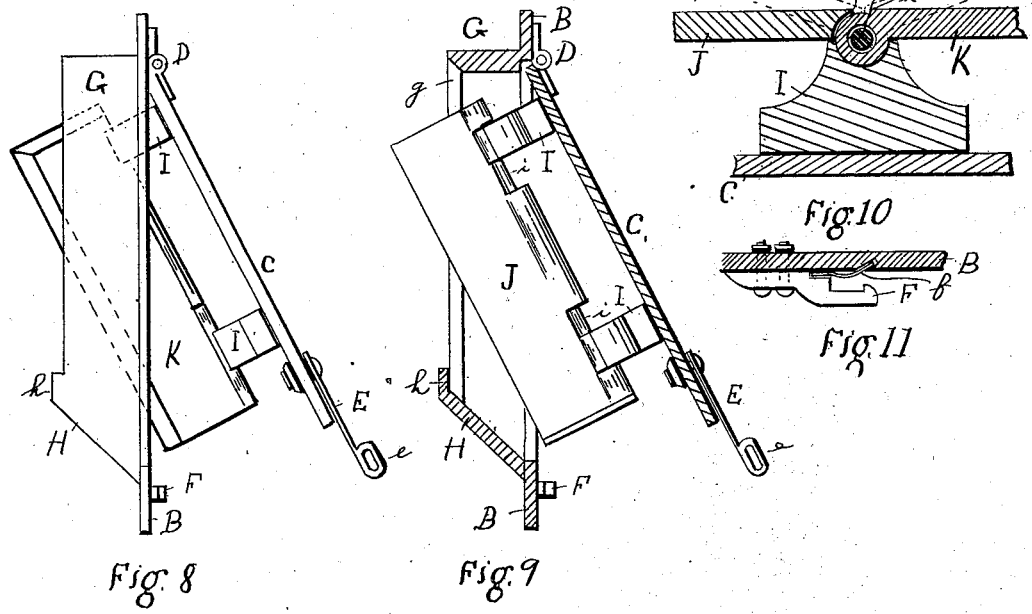
Witnesses
Inventors
John Isaacson
Evan Evans
By J. A. Rosen
Their Atty No. 730,461.                                              Patented June 9, 1903.

UNITED STATES PATENT OFFICE.

JOHN ISAACSON AND EVAN EVANS, OF TOPEKA, KANSAS.

GRAIN-DOOR.

SPECIFICATION forming part of Letters Patent No. 730,461, dated June 9, 1903.

Application filed April 6, 1903. Serial No. 151,314. (No model.)

*To all whom it may concern:*

Be it known that we, JOHN ISAACSON and EVAN EVANS, citizens of the United States of America, residing at Topeka, in the county of Shawnee and State of Kansas, have invented new and useful Improvements in Grain-Doors, of which the following is a specification.

The invention has reference to grain-doors for railway-cars.

The object is to provide a grain-door which is simple and economic in construction, not easily broken, and easily removed when the car is to be unloaded.

The invention consists of the novel combination, arrangement, and disposition of the parts, the preferred form of which is herein described and claimed and is shown in the accompanying drawings, forming part of this specification.

Figure 1:
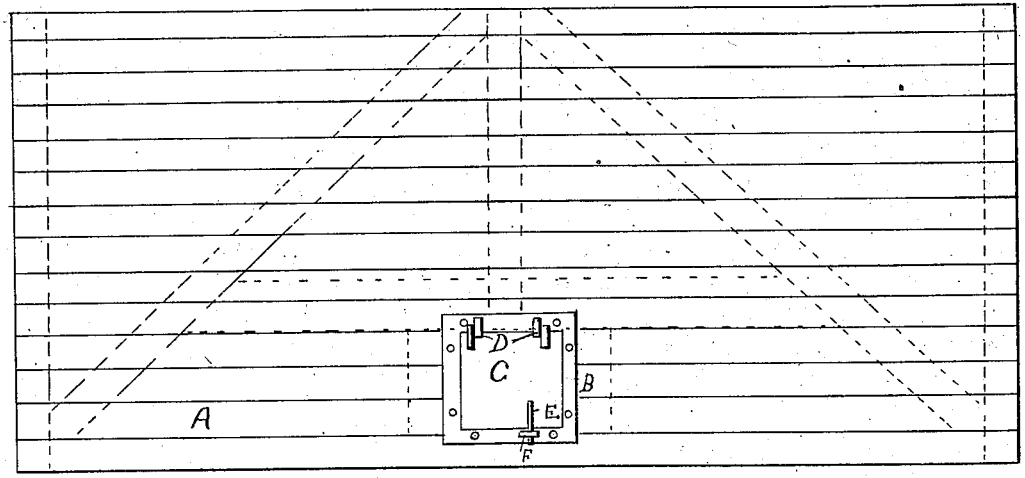
Figure 2:
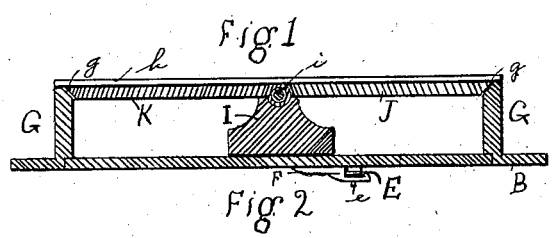
Figures 3, 4, 5:
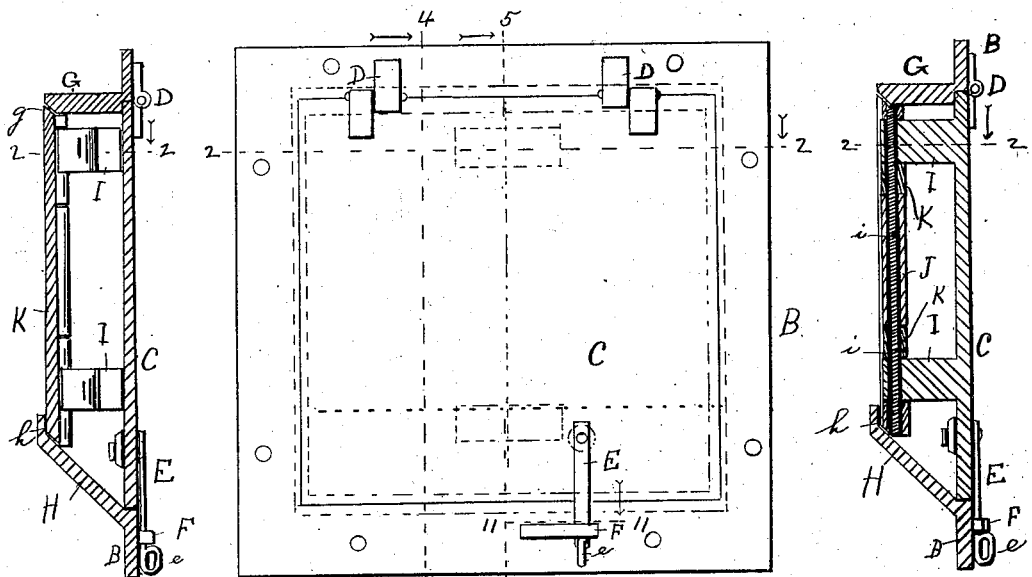

Figure 1 is an elevation. Fig. 2 is a section through the line 2 2, Figs. 3, 4, 5, 6. Fig. 3 is an enlarged elevation of the smaller door. Fig. 4 is a vertical section through the line 4 4, Fig. 3. Fig. 5 is a vertical center section through the line 5 5, Fig. 3. Fig. 6 is a rear elevation of the smaller door. Fig. 7 is the same when the door is opened to permit the grain to run out. Fig. 8 is a side view of the smaller door open. Fig. 9 is a section through the line 9 9, Fig. 7, the near inner door K being removed. Fig. 10 is a detail through the line 10 10, Fig. 6, showing how the inner doors are hinged to the lugs. Fig. 11 is a detail through the line 11 11, Fig. 3.

Like letters refer to like parts throughout the several views.

A is the main grain-door, having near the bottom a smaller door.

B is a frame or casing for the smaller door C, which is hinged to the casing by the hinges D.

E is a hasp suitably bolted to the door, and F is the catch or hook to engage it, while $f$ is a spring to hold the hasp in close engagement with the hook.

G G G are the rearwardly-extending side and top pieces, having their inner sides $g\,g\,g$ beveled. The lower rearwardly-extending piece H slopes downwardly toward the front and has an upwardly-projecting lip $h$.

Mounted on the inner side of the outer door C are the lugs I I, to which are hinged through the rod $i$ the pair of inner doors J K, whose edges are also beveled to correspond to the bevels $g\,g\,g$ on the rearwardly-extending side and top pieces G G G. These inner doors have the shoulders $i\,j$ to limit the inward swing thereof, as shown in Fig. 10.

When the door is closed, the lower ends of the inner doors J K strike the lip $h$ of the bottom H and force the doors into their closed position. In this position the pressure of the grain from within is borne largely by the top and side pieces G G G, thus relieving the hasp E and hook F of much of the outward pressure of the grain against the door.

In unloading grain from the cars with the ordinary door it has been impossible to remove the door on account of the pressure of the grain against it, and it has been usual to use an ax or crowbar or any other suitable tool to remove the door, the result being that the door has been damaged beyond repair in most cases; but with our door we relieve the pressure of the grain upon the main door by opening the smaller door at the bottom of the main door, as shown in Figs. 7, 8, 9, and permitting the grain to run out from behind the door. The main door as a whole may then be easily removed. In opening the smaller door when the outer door C is pulled outwardly by the hasp E and handle $e$ the inner doors J K in following are forced slightly together because of their engagement with the side pieces G G; but this movement of the inner doors is limited by the shoulders $j\,k$, so that an opening is left for the grain freely to run through.

In practice it is thought best to make the smaller door and its frame and parts of malleable castings.

What we claim as new, and desire to secure by Letters Patent, is—

1. The combination with the main grain-door, of the smaller door near the bottom thereof provided with suitable casing and having mounted thereon an inner door adapted to bear outwardly against the casing when the door is closed.

2. The combination with the main grain-door, of the smaller door near the bottom thereof provided with suitable casing and having mounted thereon a pair of inner door adapted to bear outwardly against the casing when the door is closed.

3. The combination with the main grain-door, of the smaller door near the bottom, provided with suitable casing having rearwardly-extending side, top and bottom flanges; the inner door mounted on the smaller door on the inner face thereof and adapted to bear outwardly against the side flanges when the door is closed.

4. The combination of the main grain-door; the smaller outer door near the bottom; suitable casing for the smaller door having rearwardly-extending side, top, and bottom pieces, the inner door mounted on the smaller outer door and adapted to rest against the inner side of the casing.

5. The combination of the main grain-door; the smaller outer door near the bottom; the inner door adapted to rest against the inner side of the casing, and adapted to open outwardly in connection with the outer door.

6. The combination of the main grain-door; the smaller outer door near the bottom; suitable casing for the smaller door having rearwardly-extending side, top, and bottom pieces, the bottom piece being inclined; the pair of inner doors hinged centrally and vertically to the outer door and adapted to bear outwardly against the casing when the door is closed; the outer door being hinged at the top to the casing.

7. The combination of the main grain-door; the smaller outer door near the bottom; suitable casing for the smaller door; the pair of inner doors hinged centrally and vertically to the outer door and adapted to bear outwardly against the casing when the door is closed; the outer door being hinged at the top to the casing.

8. In a grain-door the combination of suitable casing; a door hinged thereto at the top; a pair of inner doors hinged centrally and vertically to the first-named door and adapted to rest against the inner side of the casing when the door is closed.

In testimony whereof we have hereunto affixed our hands in presence of witnesses.

JOHN ISAACSON.
EVAN EVANS.

Witnesses:
JOSEPH GROLL,
H. C. J. ROSEN.